Jan. 31, 1967 H. A. LOZEAU 3,301,713
NON-SPILLABLE STORAGE BATTERY CONTAINER WITH COMBINATION
MEANS FOR VENTING AND FILLING
Filed Nov. 17, 1964 2 Sheets-Sheet 1
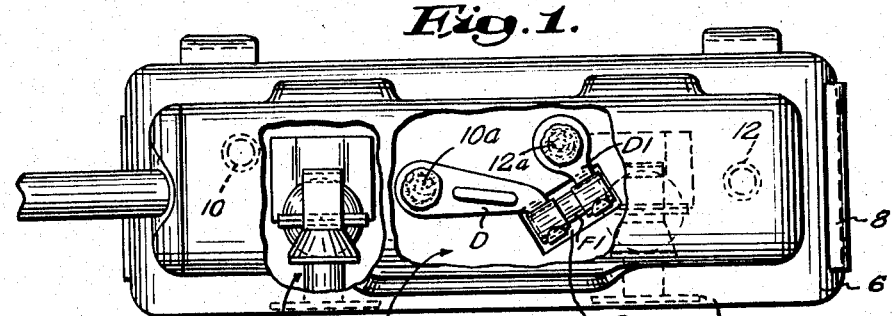
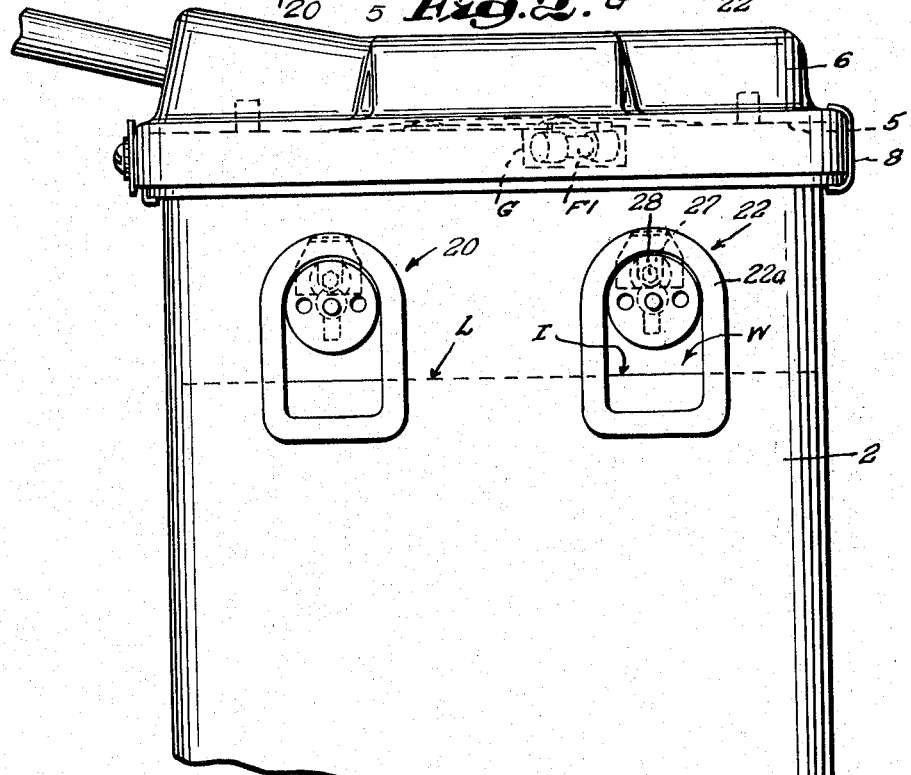
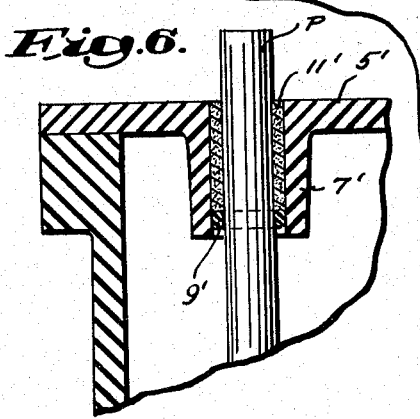
Inventor
Homer A. Lozeau
by
Attorney

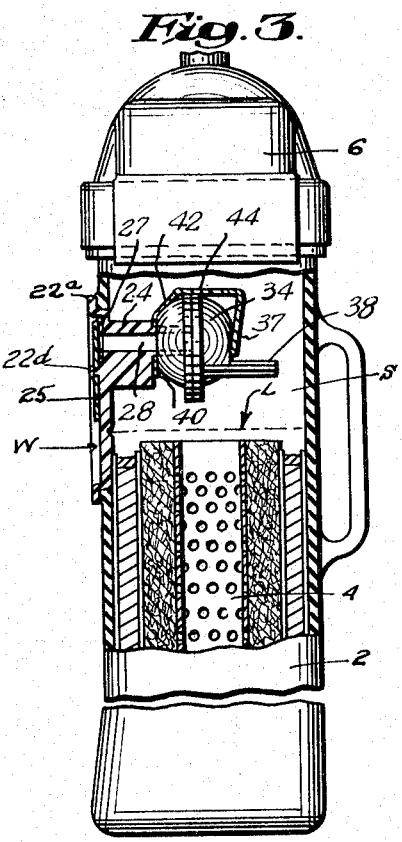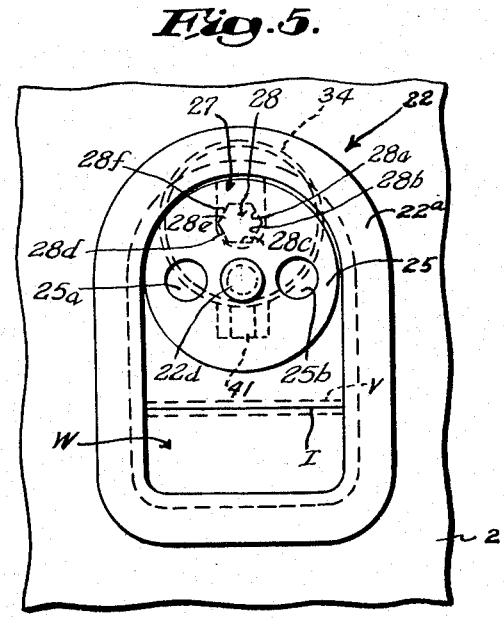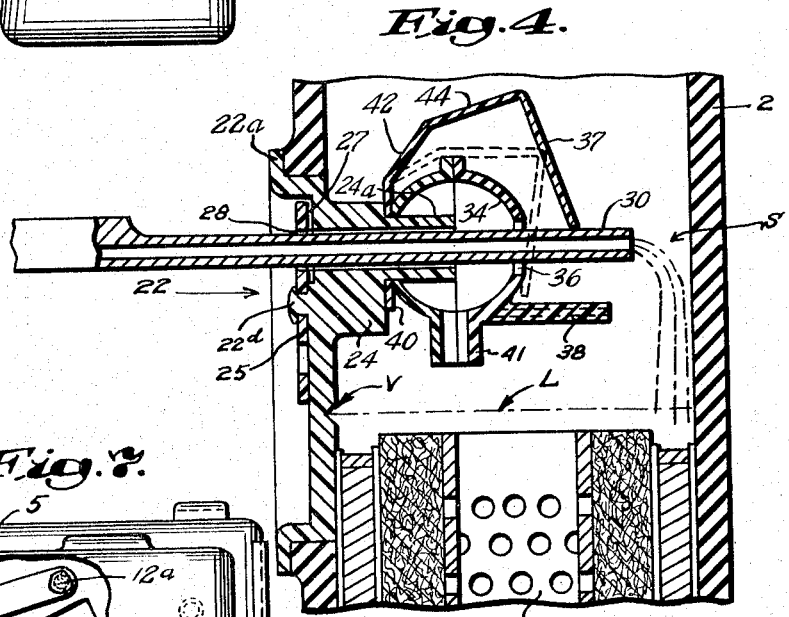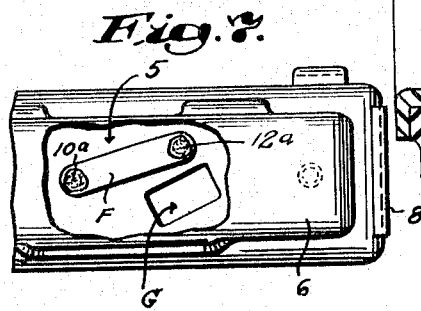

United States Patent Office 3,301,713
Patented Jan. 31, 1967

3,301,713
NON-SPILLABLE STORAGE BATTERY CONTAINER WITH COMBINATION MEANS FOR VENTING AND FILLING
Homer A. Lozeau, Worcester, Mass., assignor to Koehler Manufacturing Company, Marlboro, Mass., a corporation of Massachusetts
Filed Nov. 17, 1964, Ser. No. 411,921
10 Claims. (Cl. 136—177)

This application is a continuation-in-part of my co-pending application Serial No. 69,855 filed November 17, 1960, now Patent No. 3,179,539, entitled "Non-Spillable Storage Battery Container with Combination Means for Venting and Filling."

The present invention relates to improvements in a storage battery and, in particular, to a storage battery of the class employed in energizing a miner's electric cap lamp. As noted in my co-pending application, it is necessary to add to storage batteries of the class indicated small amounts of distilled water from time to time to maintain the battery in satisfactory condition.

The invention features of the co-pending application as well as those hereinafter disclosed are directed particularly towards improved means for periodically carrying out battery filling operations in a miner's cap lamp storage battery, having regard for certain problems frequently encountered. It will be understood that introduction of distilled water into a storage battery necessitates an inlet opening in the battery casing, as well as a vent aperture through which air and other gas may be expelled during filling and charging of the battery. In conventional battery casing construction, it has been the practice to employ two openings. One opening functions as an inlet opening. This opening must be closed by a plug when not in use and the plug must be removed each time a filling operation is carried out. The other opening functions as a small vent aperture which is ordinarily left open. If this conventional form of battery casing is tipped over, or up-ended, a quantity of fluid may in some cases spill out of the venting aperture. In other cases the venting aperture may become blocked and the required venting is prevented which may lead to troublesome consequences.

It is a chief object of the present invention to provide an improved storage battery construction and to devise more efficient means for carrying out a battery filling operation, reference being had especially to a miner's cap lamp storage battery.

A further object of the present invention is to devise more positive means for closing the filling aperture in the battery casing and also for excluding vapor and droplets from a special trap structure within the casing.

Still another object is to devise a special closure disc and air duct arrangement for closing the filling aperture in the battery casing and yet maintaining a satisfactory venting arrangement.

Still another object of the invention is to provide an improved battery casing construction for receiving and connecting battery terminals in a miner's electric cap lamp battery.

The nature of the invention and its other objects and novel features will be more fully understood and appreciated from the following description of a preferred embodiment of the invention selected for purposes of illustration and shown in the accompanying drawings, in which:

FIGURE 1 is a plan view of the storage battery of the invention with combination venting and filling means combined therewith;

FIGURE 2 is a side elevational view of the battery member shown in FIGURE 1;

FIGURE 3 is an end elevational view partly in cross section and further illustrating the combination venting and filling means of the invention in a typical operative position;

FIGURE 4 is a fragmentary cross sectional view illustrating diagrammatically a filling tube introduced into the venting and filling means of the invention to supply a battery fluid;

FIGURE 5 is a fragmentary elevational view showing the outer surface of a conduit member employed in the invention and also indicating a closure disc mounted thereon;

FIGURE 6 is a fragmentary detail cross sectional view of a battery terminal mounting arrangement; and FIGURE 7 is a fragmentary plan view of a battery terminal fusing arrangement.

Referring more in detail to the drawings, numeral 2 denotes a battery casing which may, for example, comprise a moulded plastic material. The battery casing 2 includes two cells which are comprised by battery plates 4 and a quantity of electrolyte of well-known character. It will be understood that usually a small quantity of electrolyte is to be maintained at a desired level in the battery cells above the plates 4 and a dotted line indicating this level is noted at L in FIGURES 2, 3, and 4. Above the level L is an air space S. At the upper side of the battery are terminal posts 10, 10a, 12, 12a which are electrically connected at their lower extremities to the battery plates.

The battery casing 2 is closed at its top side by a specially formed cell cover 5 which is set into a recessed upper edge of the casing. A battery top 6 is secured over the cell cover and is attached to the casing 2 by means of holding clips 8.

The two terminals 10a and 12a are electrically connected using some suitable connecting means as F shown, for example, in FIGURE 7. In another desirable embodiment of the invention, I may connect the terminal posts 10a and 12a together by means of a special fuse connector F1. This fuse connector F1 is more clearly shown in FIGURES 1 and 2 and to support the fuse connector F1, I form the cell cover 5 with a special fuse well G. The fuse member may be conveniently recessed in this fuse well by holding straps as D and D1 adapted to be electrically connected around the terminal posts 10a and 12a and formed at their opposite extremities with conductive clip portions in which the fuse member F1 may be detachably secured. The purpose of the fused connector is to prevent overloading of the battery when unusual operating conditions arise, and the moulded fuse well affords a convenient means of holding the fuse. It will be understood, however, that the battery may be used with or without the fuse member.

As noted above the cell cover 5 is of novel character made by moulding techniques. Together with the fuse well above described the cell cover preferably includes a set of depending guide edges at the underside thereof for quickly and accurately locating the cell cover within the recessed top of the battery case as indicated by the dotted line showing of FIGURE 2.

In addition, the cell cover is preferably formed with special depending terminal sleeve portions which facilitate securing the terminals in a solidly maintained position. In FIGURE 6, I have illustrated one such terminal sleeve arrangement in which reference character P denotes a terminal post. As shown in FIGURE 6 a cell cover 5' is formed with a depending terminal sleeve 7' having therein a terminal post space which is appreciably larger than the terminal P. This terminal post space is adapted to receive therein the terminal P over which is fitted an O ring element 9'. The O ring member forms a retaining member or dam at the bottom of the sleeve portion 7' and also serves to centralize the terminal in the space. With the O ring installed a fluid plastic material may be flowed in around the terminal P to fill the space between itself and the sleeve 7' and as this material hardens there is formed a solid mass 11' which rigidly holds the terminal in place.

In accordance with a further important aspect of the battery construction of the invention, the battery casing 2 is recessed at its front side at two spaced apart points immediately below the top edge of the casing to receive a pair of fluid inlet devices which are generally denoted by the arrows 20 and 22 in FIGURE 2 and each of which are of the same construction.

The fluid inlet 22 has been illustrated in greater detail in FIGURES 3, 4 and 5 in a permanently installed position. As shown therein member 22 is made up of several component parts including an orificed viewing window W, a tubular conduit section 24 communicating with the viewing window and a vapor and droplet trap device 34 arranged at the inner end of the tubular conduit section.

The viewing window W is preferably constructed of a translucent plastic material which is moulded to present an outer flange portion 22a and this flanged portion 22a is snugly fitted against the casing as shown in FIGURES 3 and 4. Within the flanged portion 22a is a central viewing area of window W across which extends a level indicator line I for indicating a correct height at which the liquid level L should be maintained as suggested in FIGURE 5. This indicator line is comprised by a V notch formed on the inner surface of window W as shown in FIGURE 4.

At the upper side of the viewing window W is formed an opening 28 which is more clearly shown in FIGURE 4 and which extends inwardly all the way through the tubular conduit portion 24. This conduit portion 24 projects into the casing for a short distance and is preferably cemented, threaded, or otherwise secured to the casing. The outer surface of the viewing window W is further recessed to form a shallow air duct 27 which communicates at right angles with the opening 28 and which extends vertically upwardly a short distance and terminates immediately below the top of the flanged portion 22a.

The viewing panel W is further formed at its outer side with a projecting part 22d which is designed to function as a pivot member for a closure disc 25 rotatably mounted thereon. The closure disc, as shown in FIGURE 5, is formed with holes 25a and 25b which are adapted to move around into register with the opening 28 when the disc is rotated. It will be observed that the closure disc overlies the opening 28 and in such a position serves to exclude dirt and other material from entering the opening 28. However, the disc may be rotated to uncover the opening 28 when either one of the openings 25a or 25b comes into register with opening 28. This groove communicates with opening 28 and extends vertically upwardly along the outer face of the viewing panel at points normally covered by the closure disc 25. By means of this arrangement it will be apparent that an air duct is provided for passage of air or other gas into and out of the battery at all times regardless of the position of the closure disc.

An important feature of opening 28 is its cross sectional configuration of preferably hexagonal form as defined by the intersection of a plurality of polygonal faces 28a, 28b, 28c, 28d, 28e, 28f. It will be apparent that by inserting a cylindrical nozzle 30 of a filling device in the opening 28 as suggested, for example in FIGURE 4, and by choosing an outer diameter for the nozzle 30 which corresponds to the distance between any two opposite faces of the opening 28, there will be arrived at a plurality of small V-shaped passageways. Through these passageways air and other gases may, I find, be vented from the air space S and out through the casing 2 in a suitably restricted manner when the nozzle is inserted.

I have found that a spacing, for example, of one-eighth of an inch across the flats of the hexagonal opening 28 provides an aperture which is large enough to receive the nozzle of a filling device 30 and provide for venting, and yet prevent any appreciable entrance of dust or other foreign matter.

At its inner end the conduit portion 24 is formed with a reduced extremity 24a (FIGURE 4) and mounted around the reduced extremity is a second major component of the invention consisting of a spherical enclosure trap body 34. The spherical trap may be rigidly secured by cementing or other fastening means so that it constitutes in effect one continuous piece with the conduit 24 and the reduced extremity 24a projects well into the trap interior.

At a point diametrically opposite the point of entrance of the reduced end 24a the trap body is formed with a vent aperture 36 and this aperture is of a size designed to exceed the outer diameter of the nozzle 30 of a filling tube such as that shown in FIGURE 4. By means of this arrangement, therefore, it will be apparent that the nozzle 30 may extend through the spherical body in spaced relation to surrounding edges of the spherical body so that an annular vent passageway runs between the nozzle and the trap through which gas or air in the space S may be conducted into the spherical body 34. From the spherical body the gases may pass through the tubular conduit 24 either when the nozzle is inserted or when it is removed.

It will also be observed that the nozzle 30 in a fully inserted position, as shown in FIGURE 4, extends well beyond the venting aperture 36 of the trap 34 so that distilled water or other fluid may be readily conducted into the space S to flow down around the plates of the battery.

In accordance with the invention, I further provide novel baffle means including a resiliently supported clip baffle 37 and a horizontally disposed fixed baffle 38. Both of these baffles are designed to shut out liquids or droplets of moisture tending to splash up from the liquid level L during battery charging operations, and at which time the nozzle 30 is removed from the battery. The baffle 38 is adequate for most usage but in the event the battery is to be subjected to violent shaking then the baffle 37 will operate to prevent spilling.

The baffle 38 is chosen of a size such that it projects transversely inward beyond the venting aperture 36 for an appreciable distance and is of a suitable size to substantially exclude liquid or droplets of moisture which tend to splash upwardly during the charging operation. However, it will be observed that the baffle 38 does not extend out to the point of discharge of liquid material from the nozzle 30 when in an inserted position. Thus there remains a space at either side of the baffle and beyond the end of the baffle 38 through which vapor may travel upwardly into the area of the aperture 36.

The clip baffle 37 consists of an angularly shaped part arranged to shut out vapor or droplets of moisture moving into the space above the baffle 38 and as will be observed from an inspection of FIGURES 3 and 4, the clip baffle has a vertically disposed portion which is normally supported in a position such that it extends across the opening 36 as shown. In this position the baffle 37 although overlying the aperture 36, does not completely seal it on the contrary occurs in slightly spaced relation to part of the aperture 36 so that vapor and air may always move in and out of the trap member.

An important feature of this improved clip baffle is its arrangement in a yieldably disposed manner such that it can be contacted by the nozzle 30 when the latter member is received through the trap aperture 36 and the baffle 37 will then be displaced upwardly into a position such as that shown in FIGURE 4. To accomplish this flexing action, I construct the clip baffle from a strip of resilient material. The strip of material may consist of a plastic or rubber-like material and is folded upon itself to provide an engaging section 40 fitted around the conduit 24 upwardly extending section 42 and a horizontally disposed section 44 which normally rests on the upper side of the trap as shown in FIGURE 3. It will be apparent that by means of this clip baffle arrangement almost all droplets of moisture and vapor may be desirably excluded and yet air may move in and out of the trap and adequate venting is preserved.

It will be apparent that the arrangement of the spherical trap around the end of the filling conduit 24 in combination with the yieldable clip baffle 37, as well as the horizontal baffle 38, provides a highly effective means of collecting droplets of moisture since any liquid material in the form of spray or bubbles occurring during the charging operation of a battery will be prevented from entering the vent opening 36 to a very large extent. What little moisture may enter around the baffle members and through the opening 36 will be collected on the inner walls of the spherical body 34 and also on the outer surface of the reduced end of the conduit member. While it is possible for air or gas to travel out through the opening 28, there is a strong possibility that any moisture which enters the spherical body will collect on the inner walls of the spherical body and then run down and drain out of the outlet 41 which is located at the bottom of the trap 34.

The size of the drain hole in the outlet member 41 has been chosen so that capillary attraction will hold a drop of moisture in the hole. This feature is to prevent spray from entering into the spherical body through this opening.

It will also be seen that by means of the closure disc 25 it becomes possible to locate a fluid inlet member in the casing with a flanged window portion and still provide for suitable venting through the shallow passageway 27, while at the same time excluding outside dirt and other foreign matter from the trap and passageway. It will be further appreciated that the arrangement of the spherical body in the space S is such that regardless of the position in which the battery may be, the trap will prevent spilling while venting can still take place.

It will be understood that changes and modifications may be made within the scope of the appended claims.

I claim:

1. A storage battery construction comprising a battery casing which includes a cell enclosure section, a cell cover secured at the upper side of the cell enclosure section and a battery top overlying the said cell cover, battery plates and a fluid body of electrolyte contained in the casing and normally overlying the tops of the battery plates, fluid inlet means received through one side of the battery casing for receiving a filling tube and delivering fluid material into the battery cells, said fluid inlet means including a translucent viewing window located in a position to show the level of the fluid body of electrolyte in the cell enclosure, an inner conduit portion and an orificed trap member mounted on the inner end of the conduit portion, said window presenting a venting and filling opening which extends through the conduit and communicates with the trap member.

2. A structure as defined in claim 1 in which the window is formed with a shallow air duct which communicates with the venting and filling opening and extends at right angles thereto, and a closure disc member rotatably mounted on the outer surface of the window.

3. A structure as defined in claim 2 in which the inner surface of the window is formed with a V notch to provide an indicator level line which may be seen from outside the casing.

4. A storage battery construction comprising a battery casing which includes a cell enclosure section, a cell cover secured at the upper side of the cell enclosure section and a battery top overlying the said cell cover, battery plates and a fluid body of electrolyte contained in the casing and normally overlying the tops of the battery plates, fluid inlet means received through one side of the battery casing for receiving a filling tube and delivering fluid material into the battery cells, said fluid inlet means including a translucent viewing window located in a position to show the level of the fluid body of electrolyte in the cell enclosure, an inner conduit portion and an orificed trap member mounted on the inner end of the conduit portion, said window presenting a venting and filling opening which extends through the conduit and communicates with the trap member, a baffle member resiliently supported on the trap and adapted to be displaced when a filling tube is located through the conduit and trap to add water to the battery.

5. In combination a storage battery of the class described comprising a casing, battery plates and a fluid body of electrolyte contained in the casing and normally overlying the tops of the battery plates, said casing having an aperture therein located above the level of the electrolyte, conduit means positioned in said aperture and extending within said casing for receiving a filling tube of circular cross section conducting battery filling material into the casing at a point above the electrolyte, said conduit means being internally defined by a plurality of angularly disposed longitudinally extending walls, whereby longitudinal gas passages are formed between the internal wall of said conduit and said tube when said filling tube is positioned in said conduit means, and a water and vapor trap mounted upon and enclosing the inner end portion of said conduit for preventing the escape of electrolyte in droplets and vapor outwardly through said conduit, said trap being formed with an opening aligned with the passage in the conduit means, said opening being of greater diameter than the diameter of the opening in said conduit to permit the passage of the filling tube therethrough for discharge by the filling tube outwardly beyond the trap and a yieldable baffle member resiliently supported against the outer surface of the trap in a position to extend across the trap opening and exclude vapor and droplets from entering therein.

6. A structure according to claim 5 in which the yieldable baffle member consists of a generally U-shaped clip one leg of which is secured to the conduit means and the other leg of which is vertically disposed over the opening on the trap in a position to be displaced upwardly when the fill tube is inserted through the trap opening.

7. A structure according to claim 5 in which the yieldable baffle member is secured in overlying relationship with respect to the trap in a position to define a space between itself and the opening in the trap.

8. In combination a storage battery of the class described comprising a casing, battery plates and a fluid body of electrolyte contained in the casing and normally overlying the tops of the battery plates, said casing having an aperture therein located above the level of the electrolyte, conduit means positioned in said aperture and extending within said casing to define an inlet for receiving a filling tube of circular cross section and conducting battery filling material into the casing at a point above the electrolyte, said conduit means being internally defined by a plurality of angularly disposed longitudinally extending walls, whereby longitudinal gas passages are formed between the internal wall of said conduit and said tube when said filling tube is positioned in said conduit means, a closure disc member rotatably mounted on the outer surface of the said conduit means, said disc member being formed with holes rotatable into and out of register with the said inlet, and a water and vapor trap mounted upon and enclosing the inner end portion of said conduit for preventing the escape of electrolyte in droplets and vapor outwardly through said conduit, said trap being formed with an opening aligned with the passage in the conduit means, said opening being of greater diameter than the diameter of the opening in said conduit to permit the passage of the filling tube therethrough for discharge by the filling tube outwardly beyond the trap.

9. A structure as defined in claim 8 in which the outer surface of the conduit is recessed to form a groove which communicates with the said inlet and which extends at right angles away from the said inlet upwardly across the path of rotation of the closure disc to form an air duct in all positions of rotation of the closure disc.

10. In combination a storage battery of the class described comprising a casing, battery plates and a fluid body of electrolyte contained in the casing and normally overlying the tops of the battery plates, said casing having an aperture therein located above the level of the electrolyte, conduit means positioned in said aperture and extending within said casing for receiving a filling tube of circular cross section conducting battery filling material into the casing at a point above the electrolyte, said conduit means being internally defined by a plurality of angularly disposed longitudinally extending walls, whereby longitudinal gas passages are formed between the internal wall of said conduit and said tube when said filling tube is positioned in said conduit means, and a water and vapor trap mounted upon and enclosing the inner end portion of said conduit for preventing the escape of electrolyte in droplets and vapor outwardly through said conduit, said trap being formed with an opening aligned with the passage in the conduit means, said trap opening being of greater diameter than the diameter of the opening in said conduit to permit the passage of the filling tube therethrough for discharge by the filling tube outwardly beyond the trap, and baffle means located in close proximity to the said opening in the trap to exclude droplets and vapor from entering said trap, said baffle means consisting of a clip secured adjacent one side of the trap and having a horizontally extending section resting on the upper surface of the trap, and said clip further including a downwardly extending baffle section which is resiliently engaged at an outer side of the trap.

References Cited by the Examiner
UNITED STATES PATENTS 1,321,960  11/1919  Wheat _____ 136—161 X
3,179,539   4/1965  Lozeau _____ 136—177

WINSTON A. DOUGLAS, *Primary Examiner.*

D. L. WALTON, *Assistant Examiner.*